(12) United States Patent
Chen et al.

(10) Patent No.: US 10,288,842 B2
(45) Date of Patent: May 14, 2019

(54) OPTICAL LENS

(71) Applicant: ABILITY ENTERPRISE CO., LTD., New Taipei (TW)

(72) Inventors: Jung-Yao Chen, New Taipei (TW); Yu-Min Chang, New Taipei (TW)

(73) Assignee: ABILITY ENTERPRISE CO., LTD., New Taipei (TW)

( * ) Notice: Subject to any disclaimer, the term of this patent is extended or adjusted under 35 U.S.C. 154(b) by 0 days.

(21) Appl. No.: 15/896,022

(22) Filed: Feb. 13, 2018

(65) Prior Publication Data

US 2018/0172951 A1 Jun. 21, 2018

Related U.S. Application Data

(63) Continuation-in-part of application No. 14/963,232, filed on Dec. 8, 2015, now abandoned.

(30) Foreign Application Priority Data

Mar. 10, 2015 (TW) .............................. 104107565 A

(51) Int. Cl.
*G02B 13/00* (2006.01)
*G02B 9/34* (2006.01)

(52) U.S. Cl.
CPC ............. *G02B 13/004* (2013.01); *G02B 9/34* (2013.01)

(58) Field of Classification Search
CPC ....................................................... G02B 9/34
See application file for complete search history.

(56) References Cited

U.S. PATENT DOCUMENTS

| 2011/0205640 | A1 | 8/2011 | Shih | |
|---|---|---|---|---|
| 2012/0069449 | A1 | 3/2012 | Taniyama | |
| 2015/0130992 | A1 | 5/2015 | Hsu et al. | |
| 2015/0260950 | A1* | 9/2015 | Chen | G02B 9/34 348/373 |
| 2016/0147046 | A1* | 5/2016 | Hsieh | H04N 5/2254 348/360 |
| 2016/0209624 | A1 | 7/2016 | Usui | |
| 2016/0291288 | A1* | 10/2016 | Huang | G02B 9/34 |

FOREIGN PATENT DOCUMENTS

JP 2013-92584 A 5/2013

OTHER PUBLICATIONS

Chinese Office Action dated Dec. 28, 2017.

* cited by examiner

*Primary Examiner* — William R Alexander
*Assistant Examiner* — Ephrem Z Mebrahtu
(74) *Attorney, Agent, or Firm* — Rabin & Berdo, P.C.

(57) ABSTRACT

An optical lens comprises in order from an object side to an image-forming side, a first lens group having positive refractive power and a second lens group having negative refractive power. The second lens group comprises a third lens and a fourth lens. The optical lens satisfies at least one of the following conditions: a thickness of the first lens group is less than a first distance between the first lens group and the second lens group, and |δ7/D4|≥2. The second distance is between a projected position which an effective diameter of an object-side surface of the fourth lens projected on an optical axis and a first intersection point which the object-side surface of the fourth lens and the optical axis is δ7, and a thickness of the fourth lens is D4.

20 Claims, 4 Drawing Sheets

OPTICAL LENS

This application is a continuation-in-part application of co-pending application Ser. No. 14/963,232, filed on Dec. 8, 2015, which claims the benefit of Taiwan application Serial No. 104107565, filed Mar. 10, 2015, the subject matter of which is incorporated herein by reference.

BACKGROUND

Technical Field

The present invention relates to an optical lens, especially to an optical lens with smaller volume and better image quality.

Description of the Related Art

In recent years, while technology of smart phones and hand-held tablet computers has greatly advanced, the requirements for optical image qualities of image-capturing devices of various mobile devices have increased as well. In addition, due to the thinning designs of mobile devices, the thickness of the optical lens of an image-capturing device has to be thinned accordingly. An optical lens is normally formed of several lenses. In order to increase the competitive advantages in the market, it has always been a pursuit in product developments to achieve size reduction, high image quality, and reduced manufacturing cost.

Therefore, it is in need to provide novel optical lenses having reduced sizes and improved image qualities with reduced costs.

SUMMARY OF THE INVENTION

The present invention is related to an optical lens having a reduced size and a good image quality with a reduced cost.

One embodiment of the present invention provides an optical lens. The optical lens includes, in order from an object side to an image-forming side: a first lens group having positive refractive power and a second lens group having negative refractive power. The first lens group includes, in order from the object side to the image-forming side, a first lens having refractive power and a second lens having refractive power. The second lens group includes, in order from the object side to the image-forming side, a third lens having refractive power and a fourth lens having refractive power. The optical lens satisfies at least one of the following conditions: a thickness of the first lens group is less than a first distance between the first lens group and the second lens group; and $|\delta7/D4|\geq 2$ wherein a second distance between a projected position which an effective diameter of an object-side surface of the fourth lens projected on an optical axis and a first intersection point which the object-side surface of the fourth lens and the optical axis is $\delta7$, and a thickness of the fourth lens is D4.

Another embodiment of the present invention provides an optical lens. The optical lens includes, in order from an object side to an image-forming side: a first lens, a second lens, a third lens and a fourth lens. The first lens has positive refractive power, and a first thickness of the first lens is D1. The second lens has refractive power, a second thickness of the second lens is D2, and a distance between an image-forming side of the first lens and an object-side surface of the second lens is D12. The third lens has refractive power, and a first distance between an image-forming side of the second lens and an object-side surface of the third lens is D23. The fourth lens has refractive power, a thickness of the fourth lens is D4, and a second distance between a projected position which an effective diameter of an object-side surface of the fourth lens projected on an optical axis and a first intersection point which the object-side surface of the fourth lens and the optical axis is $\delta7$. The optical lens satisfies at least one of the following conditions: $(D1+D12+D2)\leq D23$ and $|\delta7/D4|\geq 2$.

A further embodiment of the present invention provides an optical lens. The optical lens includes, in order from an object side to an image-forming side: a first lens, a second lens, a third lens, and a fourth lens. The first lens may have positive refractive power, the second lens may have refractive power, the third lens may be a concave-convex lens, and the fourth lens may be a concave lens.

By the features described above, the present invention provides a zoom lens having light weight, high zoom ratio, and good image quality with reduced cost.

DETAILED DESCRIPTION OF THE INVENTION

Figure 1:
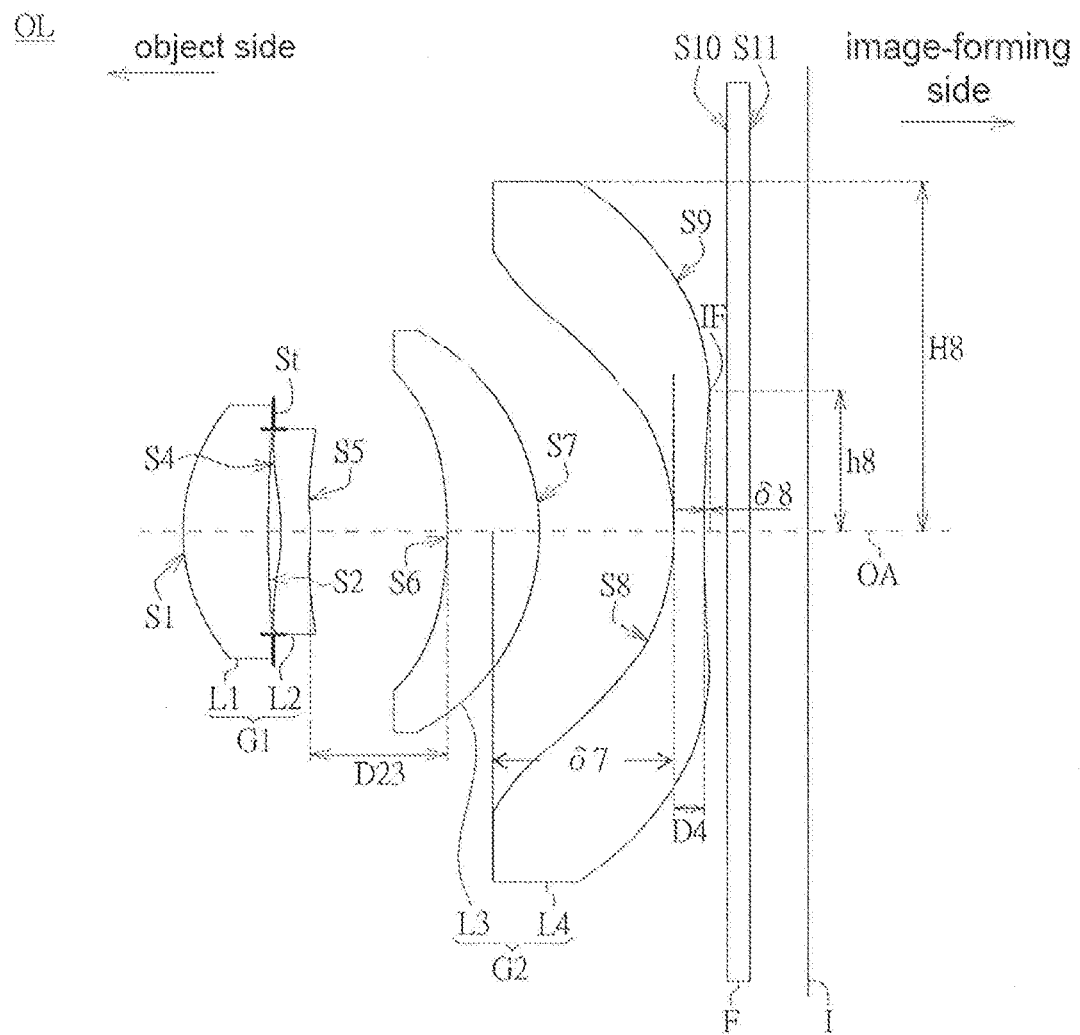
FIG. 1 shows an optical lens according an embodiment of the present invention.

The embodiments of the present invention are described in details with reference to the accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known components and process operations are not described in detail in order not to unnecessarily obscure the present invention. Identical or similar elements of the embodiments are designated with the same or similar reference numerals. While drawings are illustrated in details, it is appreciated that the quantity or sizes of the disclosed components may be greater or less than that disclosed, except expressly restricting the amount or the sizes of the components.

FIG. 1 shows an optical lens OL1 according an embodiment of the present invention. To highlight the features of the present embodiment, the drawings merely show components related to the present embodiment, and the irrelevant or minor components are omitted. The optical lens OL1 of the present embodiment may be a fixed-focus lens and may be employed in a device capable of projecting or capturing images. For example, the device may be but not limited to a hand-held communication system, a car imaging lens, a monitoring system, a digital camera, a digital camcorder or a projector.

As shown in FIG. 1, in the present embodiment, the optical lens OL1 mainly includes, in order from an object side to an image-forming side, a first lens group G1 having positive refractive power and a second lens group G2 having negative refractive power. The first lens group G1 includes, in order from the object side to the image-forming side, a first lens L1 having refractive power and a second lens L2 having refractive power. The second lens group G2 includes, in order from the object side to the image-forming side, a third lens L3 having refractive power and a fourth lens L4 having refractive power, and an object-side surface S8 of the fourth lens L4 is a concave surface.

In one embodiment, the first lens group G1 having positive refractive power is arranged with the second lens group G2 having negative refractive power.

Moreover, an object-side surface S8 of the fourth lens L4 is a concave surface curving toward the image-forming side. Particularly, the object-side surface S8 close to the optical axis OA has negative refractive power.

In one embodiment, the optical lens OL1 may satisfy the following conditions:

$$0.1 < |F1/F2| \text{ and/or } |F1/F2| < 0.5;$$

wherein F1 is focal length of the first lens L1, and F2 is the focal length of the second lens L2.

In addition, in one embodiment, the optical lens OL1 may further satisfy the following conditions:

$$-0.12 < 1/(F12+F34-D23) \text{ and/or } 1/(F12+F34-D23) < 0;$$

wherein F12 is a focal length of the first lens group G1, F34 is a focal length of the second lens group G2, and D23 is a distance between an image-forming side of the first lens group G1 and an object side of the second lens group G2. Specifically speaking, F12 is a total focal length of the first lens L1 and the second lens L2, F34 is a total focal length of the third lens L3 and the fourth lens L4, and D23 is a distance between an image-side surface S5 of the second lens L2 and an object-side surface S6 of the third lens L3. The image-side surface S5 of the second lens L2 is substantially equivalent to the surface "S5" in table 1 and table 3, and the object-side surface S6 of the third lens L3 is substantially equivalent to the surface "S6" in table 1 and table 3.

In one embodiment of the optical lens OL1, a first distance between the first lens group G1 and the second lens group G2 is larger than a thickness of the first lens group G1. That is, the optical lens OL1 may further satisfy the following condition:

the thickness of the first lens group G1 is less than the first distance between the first lens group G1 and the second lens group G2.

That is, the thickness of the first lens group G1<D23.

Wherein, D23 is a first distance between the image-forming side of the first lens group G1 and the object-side surface of the second lens group G2. As shown in FIG. 1, in this embodiment, D23 may be the first distance between the image-forming side S5 of the second lens L2 and the object-side surface S6 of the third lens L3.

In one embodiment, along the optical axis, the thickness of the first lens group G1 is less than the first distance between the first lens group G1 and the second lens group G2.

In other words, refer to FIG. 1, the optical lens OL1 also may further satisfy at least one of the following condition:

$$(D1+D12+D2) \leq D23 \text{ and } (D1+D12+D2)-D23 \leq 0$$

wherein D1 is a thickness of the first lens L1, D2 is a thickness of the first lens L2, and D12 is a distance between the image-forming side of the first lens L1 and the object-side surface of the second lens L2.

As shown in FIG. 1, an image-side surface S9 of the fourth lens L4 has an infection point IF, a minimum distance between the infection point IF of the fourth lens L4 and the optical axis OA is a first distance h8, and a minimum distance between an outer edge of the fourth lens L4 and the optical axis OA is a second distance H8.

In one embodiment, the optical lens OL1 may further satisfy the following condition:

$$|h8/H8| < 0.4.$$

Specifically speaking, the infection point IF is located on the image-side surface S9 of the fourth lens L4 from adjacent to the optical axis OA to the lens edge, and the second distance H8 may be the effective aperture of the fourth lens L4. The image-side surface S9 of the fourth lens L4 is substantially equivalent to the surface "S9" in table 1 and table 3.

Moreover, as shown in FIG. 1, the object-side surface S8 of the fourth lens L4 has an effective diameter φ7. A distance δ7 is between the projected position of the effective diameter φ7 at the optical axis OA and a first intersection point of the object-side surface S8 and the optical axis OA. A second intersection point of the image-side surface S9 of the fourth lens L4 and the optical axis OA is separated from a position of the optical axis OA on which the infection point IF is projected by an extending length δ8, and the fourth lens L4 has a thickness D4 along the optical axis OA, wherein the thickness D4 may be the thickness of the central portion of the fourth lens L4.

In one embodiment, the optical lens OL1 may further satisfy at least one of the following condition: $|δ7/D4| \geq 2$, $|δ7/D4| \geq 2.5$, $|δ7/D4| \geq 3$, $|δ7/D4| \geq 3.5$, $|δ7/D4| \geq 4$, $|δ7/D4| \geq 4.5$ and $|δ7/D4| \geq 4.8$.

In another embodiment, the optical lens OL1 may further satisfy the following condition:

$$|δ8/D4| < 0.22.$$

Specifically speaking, in the optical lens OL1 of the embodiment, the image-side surface S9 of the fourth lens L4 is aspheric. The image-side surface S9 extends, along the direction from the outer edge to the optical axis OA, toward the image-forming side of the optical lens OL1 and then reversely toward the object side of the optical lens OL1. Accordingly, the infection point IF of the fourth lens L4 is substantially the position, located on the image-side surface S9 of the fourth lens L4, being closest to the imaging-plane I.

In one embodiment, the signs of refractive powers of the first lens L1, the second lens L2, the third lens L3, and the fourth lens L4 are in staggered arrangement.

For example, the first lens L1 has positive refractive power, the second lens L2 has negative refractive power, the third lens L3 has positive refractive power, and the fourth lens L4 has negative refractive power.

In an embodiment, at least one of the first lens L1, the second lens L2, the third lens L3, and the fourth lens L4 may be an aspheric lens or a free-form lens, the aspheric lens has at least one aspheric surface, and the free-form lens has at least one free-form surface.

In another embodiment, the first lens L1, the second lens L2, the third lens L3, and the fourth lens L4 may all be aspheric lenses, each of the aspheric lenses has at least one aspheric surface, and each of the aspheric surfaces may satisfy the following equation:

$$Z = \left[\frac{(C*Y^2)}{1+\sqrt{1-(K+1)C^2Y^2}}\right] + \sum (A_i * Y^i)$$

where Z is the coordinate in the optical axis OA direction, and the direction of the light propagation is designated as positive; A4, A6, A8, A10, A12, and A14 are aspheric coefficients; K is coefficient of quadratic surface; C is reciprocal of R (C=1/R); R is the radius of curvature; Y is the coordinate in a direction perpendicular to the optical axis OA, in which the upward direction away from the optical axis OA is designated as positive. In addition, each of the parameters or the coefficients of the equation of each of the aspheric lenses may be designated respectively to determine the focal length of each of the aspheric lenses.

Besides, in one embodiment, the first lens L1, the second lens L2, the third lens L3, and the fourth lens L4 may all be plastic lenses. The material of the plastic lenses may include, but not limited to, polycarbonate, cyclic olefin copolymer (e.g. APEL), polyester resins (e.g. OKP4 or OKP4HT), or a mixture material including at least one of the above-mentioned three materials.

In one embodiment, the object-side surface S1 and the image-side surface S2 of the first lens L1 may both be aspheric. As shown in FIG. 1, the object-side surface S1 of the first lens L1 is a convex surface toward the object side, the image-forming side S2 is a concave surface concave toward the object side, and both of the object-side surface S1 and the image-forming side S2 have positive refractive powers. Furthermore, the first lens L1 may be a convex-concave lens.

In one embodiment, as shown in FIG. 1, the object-side surface S4 of the second lens L2 forms a substantially concave surface concave toward the image-forming side, and the image-side surface S5 of the second lens L2 forms a substantially concave surface concave toward the object side. In addition, the image-side surface S5 forms a convex surface protruded toward the image-forming side at a location close to the optical lens OA, i.e. the central portion of the second lens L2. Both of the object-side surface S4 and the image-side surface S5 of the second lens L2 have negative refractive powers at the optical axis OA. Furthermore, the object-side surface S4 of the second lens L2 may be concave toward the image-forming side at a location away from the optical axis OA, but the invention is not limited thereto. Both of the object-side surface S4 and the image-side surface S5 of the second lens L2 may be aspheric surfaces.

In one embodiment, as shown in FIG. 1, the object-side surface S6 of the third lens L3 is a concave surface concave toward the image-forming side, and the image-side surface S7 of the third lens L3 is a convex surface protruded toward the image-forming side. Both of the object-side surface S6 and the image-side surface S7 of the third lens L3 have negative refractive powers at the optical axis OA. Furthermore, the third lens L3 may be a concave-convex lens. Both of the object-side surface S6 and the image-side surface S7 of the third lens L3 may be aspheric surfaces.

In one embodiment, as shown in FIG. 1, the object-side surface S8 of the fourth lens L4 is a concave surface concave toward the image-forming side, the image-side surface S9 of the fourth lens L4 forms a substantially convex surface protruded toward the image-forming side and forms a concave surface concave toward the object side at a location close to the optical axis OA. The object-side surface S8 of the fourth lens L4 has negative refractive power at the optical axis OA, and the image-side surface S9 of the fourth lens L4 has positive refractive power at the optical axis OA. Furthermore, the fourth lens L4 may be a concave lens with both surfaces being concave. Both of the object-side surface S8 and the image-side surface S9 of the fourth lens L4 may be aspheric surfaces.

Moreover, as shown in FIG. 1, the optical lens OL1 may further include a stop St and a filter F. The stop St may be arranged between the image-forming side of the first lens L1 and the object side of the second lens L2. The filter F may be arranged between the fourth lens L4 and the imaging plane I. The filter F may be an infrared light filter. In addition, an image capturing unit having photoelectric converting functions may be disposed on the imaging plane I for detecting light beams passing through the optical lens OL1. Moreover, in one present embodiment, the filter F may be used as a cover glass for the image capturing unit. On the other hand, the stop St may be arranged on the object side of the first lens L1, between any two lenses L1-L4, or on the image-forming side of the fourth lens L4. However, the optical lens OL1 is not limited to the above-mentioned.

Table 1 lists the detail information of the optical lens OL1 according to an embodiment of this invention. The detail information includes the curvature radius, the thickness, the refractive index, and the Abbe number of each of the lenses, where the surface numbers of the first lens group G1 and the second lens group G2 are sequentially ordered from the object side to the image-forming side. For example, "S1" stands for the object-side surface S1 of the first lens L1, "S2" stands for the image-side surface S2 of the first lens L1, "S3" stands for the stop St, and "S10" and "S11" respectively stand for the object-side surface S10 and the image-side surface S11 of the filter F. In addition, the "thickness" stands for the distance between an indicated surface and an adjacent surface close to the image-forming side. For example, the thickness of the surface S1 indicated in table 1 is the distance between the surface S1 and the surface S2.

TABLE 1

| Lens | Surface number | Curvature radius (mm) | Thickness (mm) | Refractive index | Abbe number |
| --- | --- | --- | --- | --- | --- |
| L1 | S1 | 1.814 | 0.669 | 1.540 | 56.0 |
|  | S2 | 8.178 | 0.007 |  |  |
| St | S3 | ∞ | 0.113 |  |  |
| L2 | S4 | −4.413 | 0.50 | 1.640 | 4.0 |
|  | S5 | −9.863 | 1.416 |  |  |
| L3 | S6 | −5.984 | 1.106 | 1.540 | 5.0 |
|  | S7 | −2.172 | 1.135 |  |  |
| L4 | S8 | −2.934 | 0.330 | 1.540 | 56.0 |
|  | S9 | 5.724 | 0.241 |  |  |
| F | S10 | ∞ | 0.21 | 1.5168 | 64.17 |
|  | S11 | ∞ | 0.57 |  |  |
|  | I | ∞ |  |  |  |

In one embodiment as shown in FIG. 1, all of the surfaces of the first lens L1 to the fourth lens L4 of the optical lens OL1 may be aspheric surfaces, i.e. the surfaces S1, S2, S4, S5, S6, S7, S8, and S9, and the aspheric coefficients of the above-mentioned surfaces may be listed as indicated in table 2.

TABLE 2

|     | S1 | S2 | S4 | S5 | S6 |
|-----|------|------|------|------|------|
| K   | 5.77E−03 | 0.00E+00 | 0.00E+00 | 0.00E+00 | 1.18E+01 |
| A4  | −2.54E−03 | −5.65E−02 | 4.62E−02 | 9.88E−02 | −5.46E−03 |
| A6  | 1.05E−02 | 2.81E−02 | 1.82E−02 | 5.56E−02 | −5.82E−03 |
| A8  | −1.08E−02 | −2.63E−02 | 1.21E−02 | −4.30E−02 | 2.56E−03 |
| A10 | −4.52E−03 | −1.60E−03 | −1.23E−02 | 5.48E−02 | −1.65E−04 |
| A12 | 9.33E−03 | 2.56E−02 | 1.26E−04 | −4.61E−02 | −1.24E−03 |
| A14 | −5.48E−03 | −1.41E−02 | 2.26E−03 | 1.63E−02 | 6.99E−04 |
| A16 | 0.00E+00 | 0.00E+00 | 0.00E+00 | 0.00E+00 | −1.28E−04 |

|     | S7 | S8 | S9 |
|-----|------|------|------|
| K   | −3.27E+00 | −6.07E+00 | 9.54E−01 |
| A4  | −2.37E−02 | −4.38E−02 | −3.82E−02 |
| A6  | −3.58E−04 | −3.60E−03 | 5.49E−03 |
| A8  | −7.88E−04 | 5.86E−03 | −5.82E−04 |
| A10 | 9.40E−04 | −1.83E−03 | 3.34E−05 |
| A12 | −4.78E−04 | 2.86E−04 | −1.34E−06 |
| A14 | 1.04E−04 | −2.26E−05 | 5.91E−08 |
| A16 | −8.91E−06 | 7.11E−07 | −1.90E−09 |

Figure 2A:
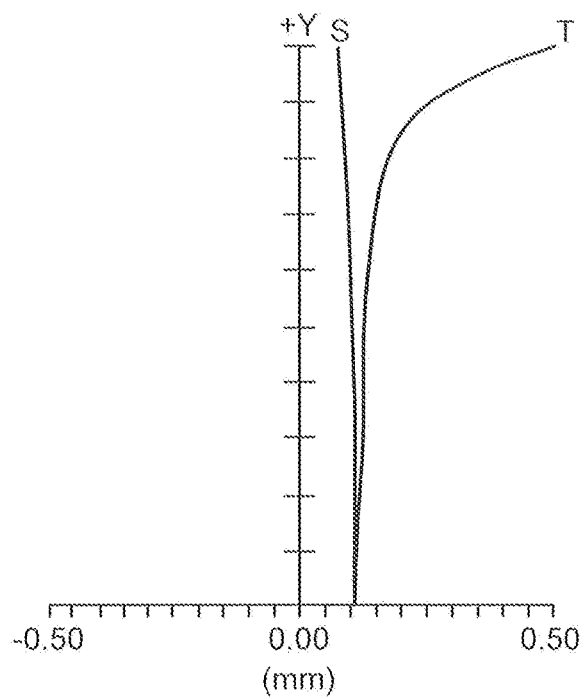
FIG. 2A shows a field curvature chart of an optical lens according to an embodiment of the present invention.

FIG. 2A shows the field curvature chart of the optical lens OL1 according to an embodiment of the present invention. The curves T and S stand for the chromatic aberration of the optical lens OL1 to the tangential rays and the sagittal rays. As shown in the drawing, the tangential values and the sagittal values of light beams are all controlled within favorable ranges.

Figure 2B:
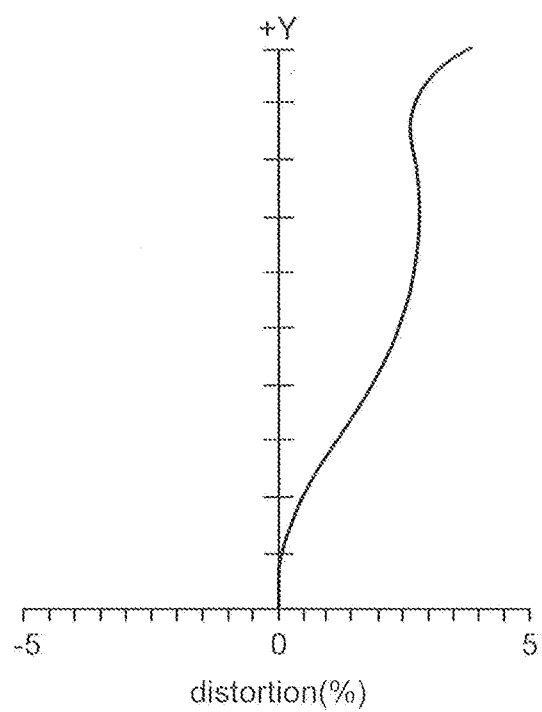
FIG. 2B shows a distortion chart of an optical lens according to an embodiment of the present invention.

FIG. 2B shows the distortion chart of the optical lens OL1 according to an embodiment of the present invention. As shown in the drawing, the distortion values of light beams are all set in the range of (0%, +4%).

Figure 3:
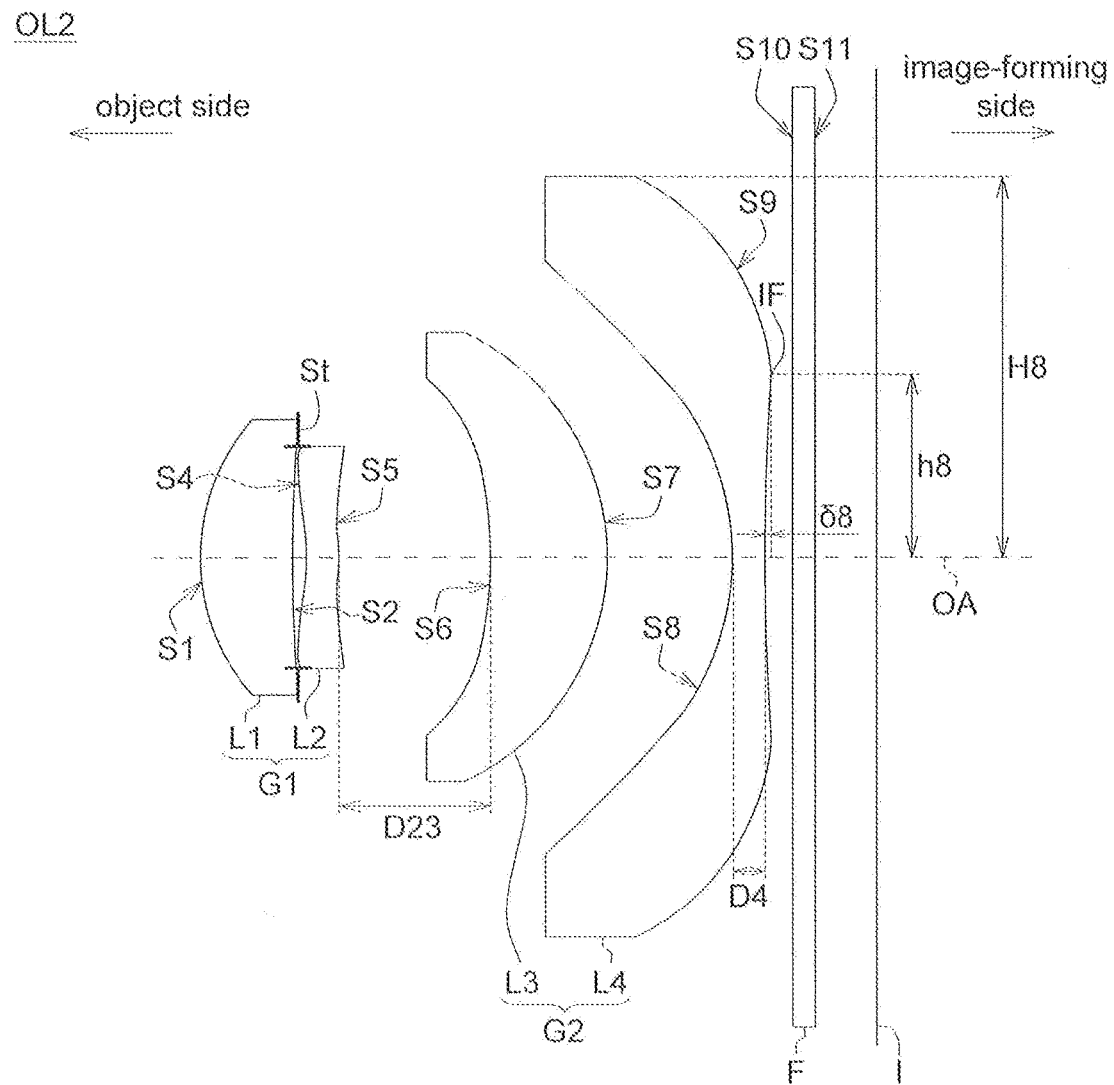
FIG. 3 shows an optical lens according another embodiment of the present invention.

FIG. 3 shows an optical lens OL2 according another embodiment of the present invention. The structure of the optical lens OL2 of the present embodiment is basically the same as that of the optical lens OL1 of FIG. 1 of previous embodiment, except that the curvature radius, the thickness, the refractive index, and the Abbe number are different between the optical lens OL1 and the optical lens OL2. The differences are explained by an example below. The similarities are as described above and are not repeated here.

Table 3 lists the detail information of the optical lens OL2 according to one embodiment as shown in FIG. 3 of this invention. The detail information includes the curvature radius, the thickness, the refractive index, and the Abbe number of each of the lenses. The reference numerals of one embodiment are the same as that of the previous embodiment, and are not repeated here.

TABLE 3

| Lens | Surface number | Curvature radius (mm) | Thickness (mm) | Refractive index | Abbe number |
|------|------|------|------|------|------|
| L1 | S1 | 1.960 | 0.839 | 1.540 | 56.0 |
|    | S2 | 9.385 | 0.000 |       |      |
| St | S3 | ∞ | 0.099 |       |      |
| L2 | S4 | −6.697 | 0.250 | 1.640 | 24.0 |
|    | S5 | −101.220 | 1.292 |       |      |
| L3 | S6 | −9.477 | 0.943 | 1.540 | 56.0 |
|    | S7 | −2.286 | 1.319 |       |      |
| L4 | S8 | −2.902 | 0.312 | 1.540 | 56.0 |
|    | S9 | 6.532 | 0.184 |       |      |
| F  | S10 | ∞ | 0.21 | 1.5168 | 64.17 |
|    | S11 | ∞ | 0.57 |       |      |
| I  |     | ∞ |      |       |      |

In one embodiment as shown in FIG. 3, all of the surfaces of the first lens L1 to the fourth lens L4 of the optical lens OL2 may be aspheric surfaces, i.e. the surfaces S1, S2, S4, S5, S6, S7, S8, and S9, and the aspheric coefficients of the above-mentioned surfaces may be listed as indicated in table 4.

TABLE 4

|     | S1 | S2 | S4 | S5 | S6 |
|-----|------|------|------|------|------|
| K   | −1.63E−01 | 0.00E+00 | 0.00E+00 | 0.00E+00 | 1.26E+01 |
| A4  | −6.37E−04 | −3.88E−02 | 3.97E−02 | 8.33E−02 | −1.20E−02 |
| A6  | 1.81E−02 | 5.26E−02 | 7.28E−02 | 2.05E−02 | −1.13E−03 |
| A8  | −8.84E−03 | −5.10E−02 | −1.02E−02 | −2.66E−02 | −2.68E−03 |
| A10 | −1.72E−02 | −6.50E−02 | 1.22E−03 | 3.81E−02 | 1.89E−03 |
| A12 | 2.29E−02 | 1.50E−01 | −6.28E−03 | −3.97E−02 | −1.21E−03 |
| A14 | −7.49E−03 | −7.88E−02 | 5.21E−04 | 1.63E−02 | 4.17E−04 |
| A16 | 0.00E+00 | 0.00E+00 | 0.00E+00 | 0.00E+00 | −5.98E−05 |

|     | S7 | S8 | S9 |
|-----|------|------|------|
| K   | −2.72E+00 | −8.83E−01 | 2.04E−01 |
| A4  | −2.40E−02 | −4.52E−02 | −4.24E−02 |
| A6  | −1.17E−03 | −1.80E−03 | 6.40E−03 |
| A8  | −1.16E−03 | 5.79E−03 | −6.65E−04 |
| A10 | 9.81E−04 | −1.82E−03 | 4.06E−05 |
| A12 | −4.42E−04 | 2.85E−04 | −1.54E−06 |
| A14 | 7.66E−05 | −2.25E−05 | 7.04E−09 |
| A16 | −4.04E−06 | 7.02E−07 | 1.78E−09 |

Figure 4A:
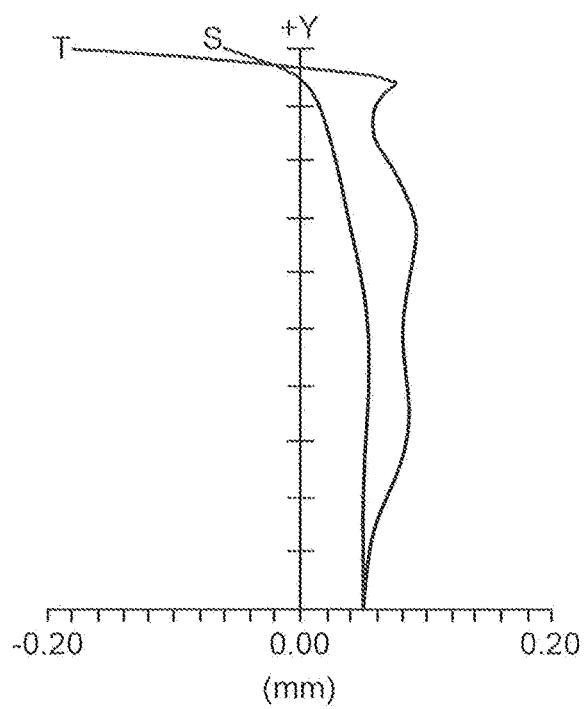
FIG. 4A shows a field curvature chart of an optical lens according to another embodiment of the present invention.

FIG. 4A shows the field curvature chart of the optical lens OL2 according to another embodiment of the present invention. The curves T and S stand for the chromatic aberration of the optical lens OL2 to the tangential rays and the sagittal rays. As shown in the drawing, the tangential values and the sagittal values of light beams are all controlled within favorable ranges.

Figure 4B:
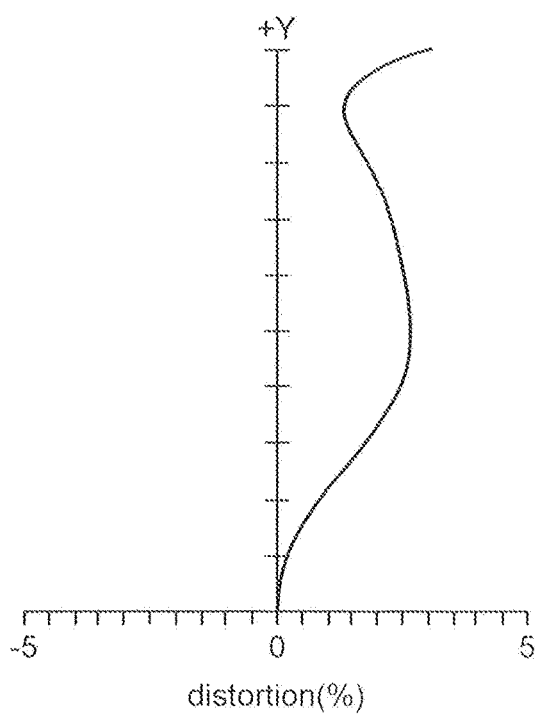
FIG. 4B shows a distortion chart of an optical lens according to another embodiment of the present invention.

FIG. 4B shows the distortion chart of the optical lens OL2 according to another embodiment of the present invention. As shown in the drawing, the distortion values of light beams are all set in the range of (0%, +3%).

As shown in FIGS. 2A-2B and FIGS. 4A-4B, the field curvature and distortion of the optical lenses OL1 and OL2 of the present embodiments are all well calibrated. Therefore, according to the embodiments of the present invention, the optical lenses OL1 and OL2 can generate high-quality images with high resolution and low chromatic aberration while satisfying the conditions of reduced costs and sizes.

While the invention has been described by way of example and in terms of the preferred embodiments, it is to be understood that the invention is not limited thereto. On the contrary, it is intended to cover various modifications, equivalents, and similar arrangements and procedures, and the scope of the invention is intended to be limited solely by the appended claims.

What is claimed is:

1. An optical lens comprising, in order from an object side to an image-forming side:
    a first lens group having positive refractive power comprising, in order from the object side to the image-forming side, a first lens having refractive power and a second lens having refractive power; and
    a second lens group having negative refractive power comprising, in order from the object side to the image-forming side, a third lens having refractive power and a fourth lens having refractive power, and the optical lens satisfies at least one of the following conditions:
    a thickness of the first lens group is less than a first distance between the first lens group and the second lens group; and
    $|\delta7/D4|\geq 2$, wherein a second distance between a projected position which an effective diameter of an object-side surface of the fourth lens projected on an optical axis and a first intersection point which the object-side surface of the fourth lens and the optical axis is $\delta7$, and a thickness of the fourth lens is D4.

2. The optical lens according to claim 1, wherein the third lens is a concave-convex lens, and/or the fourth lens is a concave lens.

3. The optical lens according to claim 1, wherein the first lens has a focal length F1, the second lens has a focal length F2, and $0.1<|F1/F2|$ and/or $|F1/F2|<0.5$.

4. The optical lens according to claim 1, wherein F12 is a total focal length of the first lens and the second lens, F34 is a total focal length of the third lens and the fourth lens, D23 is a third distance between an image-forming side of the second lens and an object side of the third lens, and $-0.12<1/(F12+F34-D23)$ and/or $1/(F12+F34-D23)<0$.

5. The optical lens according to claim 1, wherein an image-side surface of the fourth lens has an infection point, a minimum distance between the infection point of the fourth lens and an optical axis is a fourth distance h8, a minimum distance between an outer edge of the fourth lens and the optical axis is a fifth distance H8, and $|h8/H8|<0.4$.

6. The optical lens according to claim 1, wherein an image-side surface of the fourth lens has an infection point, an intersection point of the image-side surface of the fourth lens and an optical axis is separated from a position of the optical axis on which the infection point is projected by an extending length $\delta8$, the fourth lens has a thickness D4 along the optical axis, and $|\delta8/D4|<0.22$.

7. The optical lens according to claim 1, wherein the optical lens satisfies at least one of the following conditions:
    the second lens has negative refractive power;
    the third lens has positive refractive power; and
    the fourth lens has negative refractive power.

8. The optical lens according to claim 1, wherein the optical lens satisfies
    at least one of the following conditions:
    at least one of the first lens, the second lens, the third lens and the fourth lens is an aspheric lens or a free-form lens; and
    at least one of the first lens, the second lens, the third lens and the fourth lens is a plastic lens.

9. The optical lens according to claim 1, wherein the optical lens satisfies
    at least one of the following conditions:
    an object-side surface of the first lens is a convex surface toward the object side;
    an object-side surface of the second lens is a concave surface toward the image-forming side; and
    an object-side surface of the third lens is a concave surface toward the image-forming side.

10. The optical lens according to claim 1, wherein the second lens has an image-side surface having negative curvature radius at an optical axis and having positive curvature radius at an edge away from the optical axis.

11. An optical lens comprising, in order from an object side to an image-forming side:
    a first lens having positive refractive power, and a first thickness of the first lens is D1;
    a second lens having refractive power, a second thickness of the second lens is D2, and a distance between an image-forming side of the first lens and an object-side surface of the second lens is D12;
    a third lens having refractive power, and a first distance between an image-forming side of the second lens and an object-side surface of the third lens is D23; and
    a fourth lens having refractive power, a thickness of the fourth lens is D4, a second distance between a projected position which an effective diameter of an object-side surface of the fourth lens projected on an optical axis and a first intersection point which the object-side surface of the fourth lens and the optical axis is $\delta7$, and the optical lens satisfies at least one of the following conditions: $(D1+D12+D2)\leq D23$ and $|\delta7/D4|\geq 2$.

12. The optical lens according to claim 11, wherein the third lens is a concave-convex lens, and/or the fourth lens is a concave lens.

13. The optical lens according to claim 11, wherein the first lens has a focal length F1, the second lens has a focal length F2, and $0.1<|F1/F2|$ and/or $|F1/F2|<0.5$.

14. The optical lens according to claim 11, wherein F12 is a total focal length of the first lens and the second lens, F34 is a total focal length of the third lens and the fourth lens, D23 is a third distance between an image-forming side of the second lens and an object side of the third lens, and $-0.12<1/(F12+F34-D23)$ and/or $1/(F12+F34-D23)<0$.

15. The optical lens according to claim 11, wherein an image-side surface of the fourth lens has an infection point, a minimum distance between the infection point of the fourth lens and an optical axis is a fourth distance h8, a minimum distance between an outer edge of the fourth lens and the optical axis is a fifth distance H8, and $|h8/H81|<0.4$.

16. The optical lens according to claim 11, wherein an image-side surface of the fourth lens has an infection point, a second intersection point of an image-side surface of the fourth lens and an optical axis is separated from a position of the optical axis on which the infection point is projected by an extending length δ8, the fourth lens has a thickness D4 along the optical axis, and |δ8/D4|<0.22.

17. The optical lens according to claim 11, wherein the optical lens satisfies
at least one of the following conditions:
the second lens has negative refractive power;
the third lens has positive refractive power; and
the fourth lens has negative refractive power.

18. The optical lens according to claim 11, wherein the optical lens satisfies
at least one of the following conditions:
at least one of the first lens, the second lens, the third lens, and the fourth lens is an aspheric lens or a free-form lens' and
at least one of the first lens, the second lens, the third lens, and the fourth lens is a plastic lens.

19. The optical lens according to claim 11, wherein the optical lens satisfies
at least one of the following conditions:
an object-side surface of the first lens is a convex surface toward the object side;
an object-side surface of the second lens is a concave surface toward the image-forming side; and
an object-side surface of the third lens is a concave surface toward the image-forming side.

20. The optical lens according to claim 11, wherein the second lens has an image-side surface having negative curvature radius at an optical axis and having positive curvature radius at an edge away from the optical axis.

* * * * *